US012604157B2

(12) United States Patent
Tertinek

(10) Patent No.: US 12,604,157 B2
(45) Date of Patent: Apr. 14, 2026

(54) SYSTEM AND METHOD FOR FACILITATING DETECTING AN EXTERNAL OBJECT

(71) Applicant: NXP B.V., Eindhoven (NL)

(72) Inventor: Stefan Tertinek, Graz (AT)

(73) Assignee: NXP B.V., Eindhoven (NL)

( * ) Notice: Subject to any disclaimer, the term of this patent is extended or adjusted under 35 U.S.C. 154(b) by 673 days.

(21) Appl. No.: 18/051,103

(22) Filed: Oct. 31, 2022

(65) Prior Publication Data

US 2023/0156429 A1 May 18, 2023

(30) Foreign Application Priority Data

Nov. 18, 2021 (EP) .................................... 21209113

(51) Int. Cl.
H04W 4/029 (2018.01)
H04W 4/02 (2018.01)
(Continued)

(52) U.S. Cl.
CPC ........... H04W 4/029 (2018.02); H04W 4/025 (2013.01); H04W 72/0453 (2013.01); H04W 84/12 (2013.01)

(58) Field of Classification Search
CPC ...... G01S 7/0235; G01S 13/003; G01S 13/04; G01S 13/06; G01S 13/86; G01S 13/88; G01S 13/0209; G01S 7/0232; G01S 13/325; G01S 13/825; G01S 13/872; H04W 4/025; H04W 4/029; H04W 72/0446; H04W 72/0453; H04W 84/12
See application file for complete search history.

(56) References Cited

U.S. PATENT DOCUMENTS 10,554,236 B1 *   2/2020   Rausch .................. H04B 15/04
10,613,213 B2 *   4/2020   Silverstein .............. G01S 13/87
(Continued)

FOREIGN PATENT DOCUMENTS

DE     102015224787 A1 *   6/2017

OTHER PUBLICATIONS

Restuccia, F., "IEEE 802.11bf: Toward Ubiquitous Wi-Fi Sensing", https://arxiv.org/pdf/2103.14918.pdf, Mar. 27, 2021.

*Primary Examiner* — Charles N Appiah

(57) ABSTRACT

In accordance with a first aspect of the present disclosure, a system is provided for facilitating detecting an external object, the system comprising: at least one first communication unit configured to transmit and receive one or more first signals; at least one second communication unit configured to transmit and receive one or more second signals; a controller configured to control the first communication unit and the second communication unit, wherein the controller is configured to cause the first communication unit and the second communication unit to operate concurrently and to use the first signals received by the first communication unit and the second signals received by the second communication unit while said first communication unit and second communication unit are operating concurrently for detecting the external object. In accordance with other aspects of the present disclosure, a corresponding method for facilitating detecting an external object is conceived, as well as a computer program for carrying out said method.

20 Claims, 6 Drawing Sheets

(51) Int. Cl.
　　*H04W 72/0453*　　　(2023.01)
　　*H04W 84/12*　　　　(2009.01)

(56)　　　　　　　References Cited

U.S. PATENT DOCUMENTS

| | | | |
|---|---|---|---|
| 2008/0170559 A1 | 7/2008 | Zumsteg | |
| 2008/0234899 A1* | 9/2008 | Breed | B60N 2/0278 |
| | | | 701/1 |
| 2016/0028452 A1* | 1/2016 | Chu | H04L 1/16 |
| | | | 375/267 |
| 2020/0191932 A1* | 6/2020 | Leabman | G01S 13/106 |
| 2020/0200892 A1* | 6/2020 | Rajab | G01S 13/753 |
| 2020/0400777 A1 | 12/2020 | Lentsch et al. | |
| 2021/0055413 A1* | 2/2021 | Engewald | H04B 1/0483 |
| 2021/0076396 A1 | 3/2021 | Chen et al. | |
| 2021/0199796 A1* | 7/2021 | Khasnobish | A61B 5/0816 |
| 2021/0284098 A1 | 9/2021 | Scott et al. | |
| 2024/0079770 A1* | 3/2024 | Harper | H01Q 1/521 |

* cited by examiner

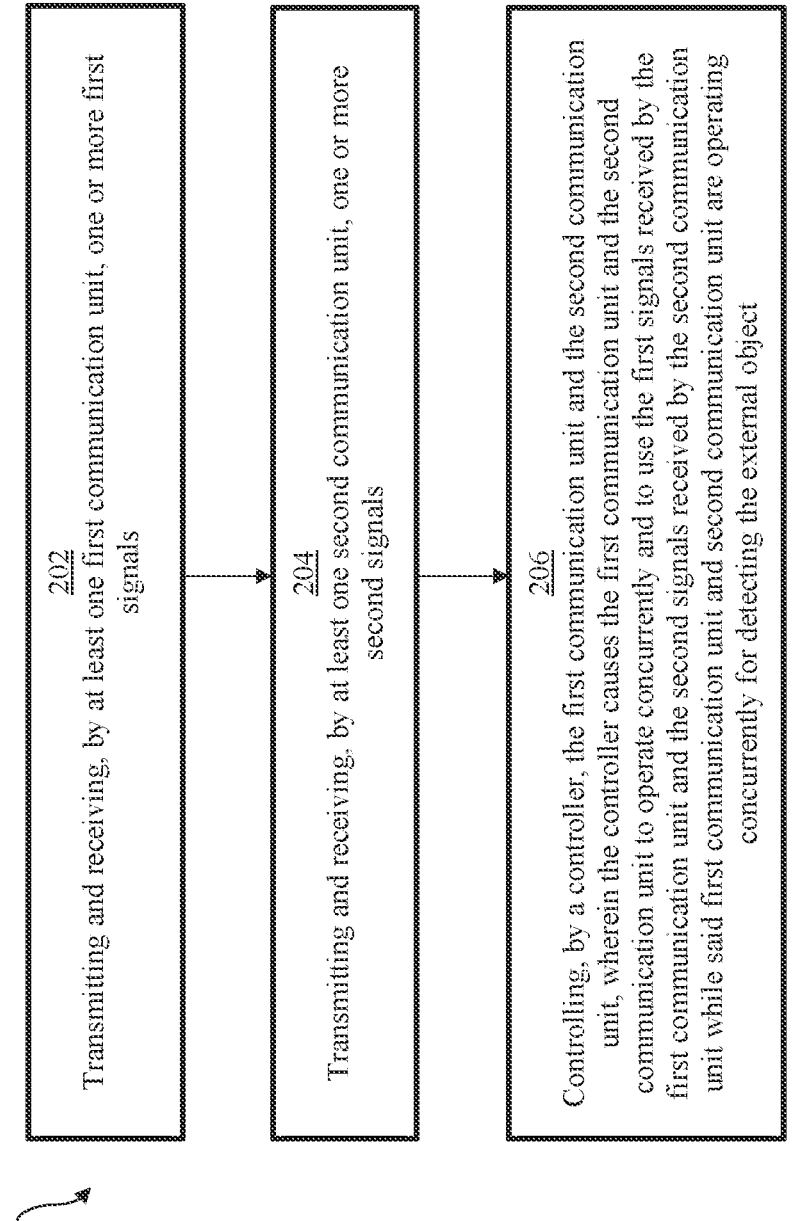

200

202

Transmitting and receiving, by at least one first communication unit, one or more first signals

204

Transmitting and receiving, by at least one second communication unit, one or more second signals

206

Controlling, by a controller, the first communication unit and the second communication unit, wherein the controller causes the first communication unit and the second communication unit to operate concurrently and to use the first signals received by the first communication unit and the second signals received by the second communication unit while said first communication unit and second communication unit are operating concurrently for detecting the external object

Fig. 2

SYSTEM AND METHOD FOR FACILITATING DETECTING AN EXTERNAL OBJECT

CROSS-REFERENCE TO RELATED APPLICATIONS

This application claims the priority under 35 U.S.C. § 119 of European Patent application no. 21209113.6, filed on 18 Nov. 2021, the contents of which are incorporated by reference herein.

TECHNICAL FIELD

The present disclosure relates to a system for facilitating detecting an external object. Furthermore, the present disclosure relates to a corresponding method for facilitating detecting an external object, and to a computer program for carrying out said method.

BACKGROUND

Target detection systems may employ different communication technologies for detecting the presence of a target, i.e., for detecting the presence of an external object. For instance, a target detection system may employ a common radio frequency (RF) communication technology, for example Wi-Fi communication technology, for this purpose. Alternatively, a target detection system may employ a radar-based RF communication technology, for example an ultra-wideband (UWB) communication unit operating in a radar mode.

SUMMARY

In accordance with a first aspect of the present disclosure, a system is provided for facilitating detecting an external object, the system comprising: at least one first communication unit configured to transmit and receive one or more first signals; at least one second communication unit configured to transmit and receive one or more second signals; a controller configured to control the first communication unit and the second communication unit, wherein the controller is configured to cause the first communication unit and the second communication unit to operate concurrently and to use the first signals received by the first communication unit and the second signals received by the second communication unit while said first communication unit and second communication unit are operating concurrently for detecting the external object.

In one or more embodiments, the first communication unit is an ultra-wideband communication unit operated in a radar mode; the second communication unit is a Wi-Fi communication unit operated in a radio frequency (RF) communication mode, a Wi-Fi communication unit operated in a radar mode, a Bluetooth communication unit, or an ultra-wideband communication unit operated in a radar mode in a frequency range different from the frequency range in which the first communication unit is operated.

In one or more embodiments, the first communication unit and the second communication unit are configured to operate at different frequencies, and the controller is configured to cause the first communication unit and the second communication unit to operate concurrently by enabling simultaneous sensing operations of the first communication unit and the second communication unit within a predefined time slot.

In one or more embodiments, the first communication unit and the second communication unit are configured to operate at different frequencies, and the controller is configured to cause the first communication unit and the second communication unit to operate concurrently by enabling sequential sensing operations of the first communication unit and the second communication unit within a predefined time slot.

In one or more embodiments, the controller is further configured to cause the first communication unit and the second communication unit to operate at different frequencies having a gap therebetween.

In one or more embodiments, the controller is further configured to cause the first communication unit and the second communication unit to operate at different frequencies having no gap therebetween.

In one or more embodiments, the first communication unit and the second communication unit are configured to operate at substantially the same frequency, and the controller is configured to cause the first communication unit and the second communication unit to operate concurrently by enabling sequential sensing operations of the first communication unit and the second communication unit within a predefined time slot.

In one or more embodiments, the system further comprises an antenna which is shared between the first communication unit and the second communication unit.

In one or more embodiments, the system further comprises a first antenna coupled to the first communication unit and a second antenna coupled to the second communication unit.

In one or more embodiments, the first communication unit and the second communication unit are implemented on a single integrated circuit and integrated into a single communication device; or the first communication unit and the second communication unit are implemented on separate integrated circuits and integrated into a single communication device; or the first communication unit and the second communication unit are implemented on separate integrated circuits and integrated into separate communication devices.

In accordance with a second aspect of the present disclosure, a method is conceived for facilitating detecting an external object, comprising: transmitting and receiving, by at least one first communication unit, one or more first signals; transmitting and receiving, by at least one second communication unit, one or more second signals; controlling, by a controller, the first communication unit and the second communication unit, wherein the controller causes the first communication unit and the second communication unit to operate concurrently and to use the first signals received by the first communication unit and the second signals received by the second communication unit while said first communication unit and second communication unit are operating concurrently for detecting the external object.

In one or more embodiments, the first communication unit is an ultra-wideband communication unit operated in a radar mode; the second communication unit is a Wi-Fi communication unit operated in a radio frequency (RF) communication mode, a Wi-Fi communication unit operated in a radar mode, a Bluetooth communication unit, or an ultra-wideband communication unit operated in a radar mode in a frequency range different from the frequency range in which the first communication unit is operated.

In one or more embodiments, the first communication unit and the second communication unit operate at different frequencies, and the controller causes the first communication unit and the second communication unit to operate concurrently by enabling simultaneous sensing operations of the first communication unit and the second communication unit within a predefined time slot.

In one or more embodiments, the first communication unit and the second communication unit operate at different frequencies, and the controller causes the first communication unit and the second communication unit to operate concurrently by enabling sequential sensing operations of the first communication unit and the second communication unit within a predefined time slot.

In accordance with a third aspect of the present disclosure, a computer program is provided, comprising executable instructions which, when executed by a system for facilitating detecting an external object, cause said system to carry out a method of the kind set forth.

DESCRIPTION OF DRAWINGS

Embodiments will be described in more detail with reference to the appended drawings.

FIG. 2 shows an illustrative embodiment of a method for facilitating an external object.

DESCRIPTION OF EMBODIMENTS

Figure 1:
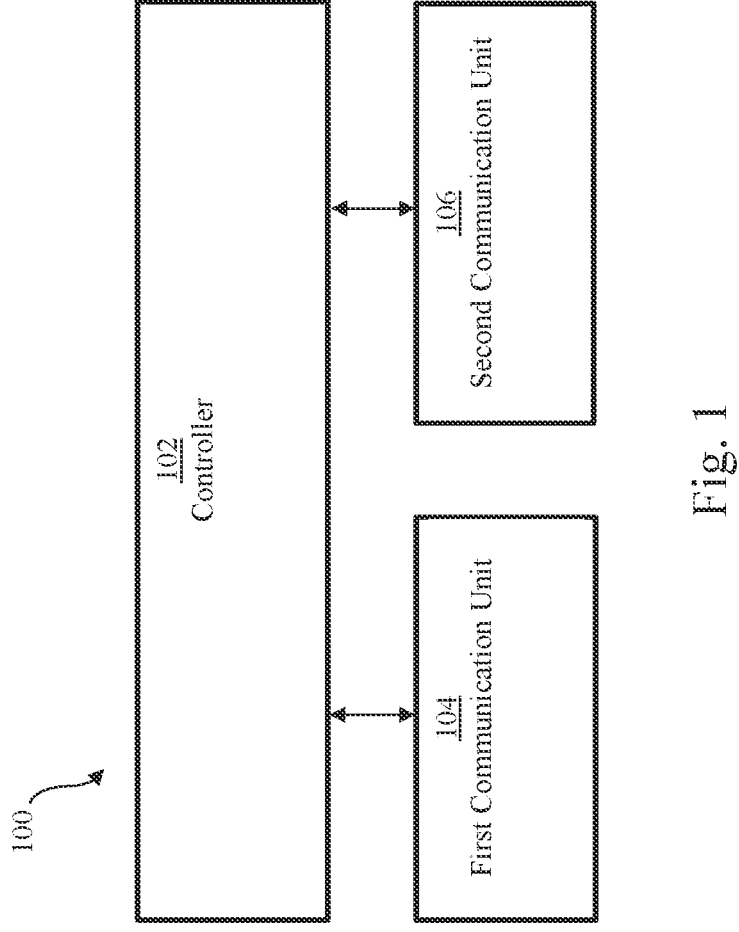
FIG. 1 shows an illustrative embodiment of a system for facilitating an external object.

As mentioned above, target detection systems may employ different communication technologies for detecting the presence of a target, i.e., for detecting the presence of an external object. For instance, a target detection system may employ a common RF communication technology, for example Wi-Fi communication technology, for this purpose. Alternatively, a target detection system may employ a radar-based RF communication technology, for example a UWB communication unit operating in a radar mode.

In particular, the Institute of Electrical and Electronics Engineers (IEEE) has started the 802.11bf Task Group (TGbf) to standardize sensing protocols in the Wi-Fi channels in the sub-7 GHz and 60 GHz frequency ranges. The scope of the standard is as follows. For the sub-7 GHz frequency range, the physical layer (PHY) reuses an existing physical layer protocol data unit (PPDU) waveform, while for the medium access control (MAC) protocols are standardized to allow sensing between chipsets of different vendors. For the 60 GHz frequency range, new PHY sensing waveforms and MAC protocols are standardized. The applications of Wi-Fi based target detection are mostly indoor applications, including in-car sensing applications. Simultaneously, the IEEE 802.15.4 TGbf started working on standardizing UWB-based radar operations in the 6-10 GHz frequency band, extending the already standardized UWB ranging technology operating in this band.

Table 1 summarizes the advantages and disadvantages of both systems in terms of key performance indicators (KPIs), particularly as they pertain to the covered frequency range (6-10 versus 60 GHz).

TABLE 1

| KPI | 6-10 GHz (UWB/ Wi-Fi) | 60 GHz (Wi-Fi) | Comment |
|---|---|---|---|
| Path loss | Low | High | Low path loss → long range/ coverage |
| Penetration loss | Low | High | Low penetration loss → non line of sight possible |
| Power consumption | Low | High | Low power consumption → longer battery life |
| Bandwidth | Low | High | High bandwidth → high range/ velocity resolution |
| Antenna size | Large | Small | Small antenna array → high angular resolution |
| Form factor | High | Low | Low form factor → compact design |
| Interference | High | Low | Fewer wireless technologies at 60 GHz → low interference |

As shown in table 1, operating each of the different sensing systems independently incurs specific disadvantages, which may be difficult to overcome. In particular, it may be difficult to achieve an acceptable overall target detection performance, to trade off the detection range of the systems with the sensitivity of the systems, and to provide flexibility in avoiding congested frequency bands.

Now discussed are a system and method for facilitating detecting an external object, which may overcome at least some of the above-mentioned disadvantages. In particular, the presently disclosed system and method may achieve an acceptable overall target detection performance, enable trading off detection range with sensitivity, and provide flexibility in avoiding congested frequency bands.

FIG. 1 shows an illustrative embodiment of a system 100 for facilitating an external object. The system 100 comprises a controller 102 which is operatively coupled to a first communication unit 104 and to a second communication unit 106. The first communication unit 104 is configured to transmit and receive one or more first signals. Furthermore, the second communication unit 106 is configured to transmit and receive one or more second signals. Furthermore, the controller 102 is configured to control the first communication unit 104 and the second communication unit 106. More specifically, the controller 102 is configured to cause the first communication unit 104 and the second communication unit 106 to operate concurrently, and to use the first signals received by the first communication unit 104 and the second signals received by the second communication unit 106, while said first communication unit 104 and second communication unit 106 are operating concurrently, for detecting the external object. The skilled person will appreciate that the controller 102 may cause said units 104, 106 to operate concurrently by, for example, transmitting suitable instructions or operating commands to said units 104, 106. In particular, when the first communication unit 104 and second communication unit 106 are operating concurrently, they may both receive signals which are indicative of the presence of an external object. In that case, the controller 102 may use the signals received by both units for detecting the external object. In this way, the overall detection performance may be increased, since the controller 102 may use information from different units 104, 106 having specific detection capabilities. More specifically, the target detection performance (e.g., the range, velocity and angle determination) may be increased using the capabilities of both the first communication unit 104 and the second communication unit 106 (e.g., fusing Doppler information). Furthermore, congested or occupied channels may be avoided by switching the detection mode from radar-based detection to RF communication-based detection and back.

In one or more embodiments, the first communication unit is an ultra-wideband communication unit operated in a radar mode, and the second communication unit is a Wi-Fi communication unit operated in a radio frequency, RF, communication mode, a Wi-Fi communication unit operated in a radar mode, a Bluetooth communication unit, or an ultra-wideband communication unit operated in a radar mode in a frequency range different from the frequency range in which the first communication unit is operated. In particular, the RF communication mode involves performing sensing operations which are based on analyzing channel state information (CSI). By using these types of communication units, the target detection performance of the system may be further increased. In particular, these types of communication units may provide suitable data for detecting the presence as well as the range, velocity and angle of an external object.

Accordingly, different implementations of the system may be possible. For instance, the first communication unit may be a UWB radar unit operated in the frequency range of 6-10 GHz, while the second communication unit may be Wi-Fi communication unit operated in the RF communication mode (i.e., a CSI-based sensing mode) in the sub-7 GHz frequency range or at 60 GHz. In another implementation, the first communication unit may be a UWB radar unit operated in the frequency range of 6-10 GHz, while the second communication unit may be Wi-Fi communication unit operated in the radar mode in the sub-7 GHz frequency range or at 60 GHz. In a further implementation, the first communication unit may be a UWB radar unit operated in the frequency range of 6-10 GHz, while two second communication units are used, one of which is a Wi-Fi communication unit operated in the RF communication mode and the other is a Wi-Fi communication unit operated in the radar mode, again in the sub-7 GHz frequency range or at 60 GHz. Furthermore, in another implementation, the first communication unit may be a UWB radar unit operated in the frequency range of 6-10 GHz, while the second communication unit may be a UWB radar unit operated at 60 GHz. In that case, a third communication unit may optionally be included in the system, for example a Wi-Fi communication unit operated in the sub-7 GHz frequency range or at 60 GHz.

UWB-based radar units facilitate detecting objects over a long range, with high accuracy and low power consumption. Radar-based detection systems are able to detect external objects by transmitting radar signals which are reflected by said objects. For instance, a radar device may transmit a signal which is reflected by a human being moving in a particular manner. Subsequently, the reflected signal may be received by the radar device, thereby resulting in a detection of the moving human being. In this way, a kicking movement toward a trunk may be detected, for example. In some examples, such a radar-based detection system may be used to assist a smart access system. In particular, in UWB-based smart access systems a radar sensor can assist a UWB ranging device to make an access procedure more convenient for a user. For example, a vehicle may operate a radar sensor behind the rear bumper and automatically open the trunk when detecting that a user performs a kicking motion towards the sensor and when a legitimate key fob is within the vehicle's proximity. The latter may require that the key fob has a predefined distance to the vehicle and that the key fob has successfully performed an authorization process with the vehicle. To reduce system cost the same UWB device can operate in both a radar and a ranging mode. Alternatively, the radar sensor may be based on a technology different from UWB.

UWB is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The angle-of-arrival (AoA) mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode. As used in this description, the ranging mode of operation may therefore be extended to include the AoA mode of operation, in the sense that when a device operates in the ranging mode, it may optionally perform additional operations which are typically performed in the AoA mode of operation.

In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The radar mode of operation may be used to advantage to detect (i.e., sense) the presence of objects or human beings. However, the radar mode of operation may also be used to estimate a distance, although with a lower accuracy than the ranging mode of operation will typically achieve. The skilled person will appreciate that the given examples are non-limiting examples of how the different modes of operation can be implemented. In other words, the modes may be implemented differently, depending on the requirements imposed by the application, for example.

Wi-Fi communication units, when operating in the frequency range around 60 GHz, facilitate detecting objects with a high velocity resolution, a high angular resolution and low interference. Wi-Fi communication units may also be based on a compact design, thereby resulting in a low system cost. Wi-Fi communication units may facilitate object detection by providing channel state information (CSI).

In particular, Wi-Fi communication units may detect objects when they operated in a CSI-based sensing mode or in a radar-based sensing mode. These modes have been defined in the following documents published by the IEEE: *Overview of Wi-Fi sensing protocol*, published on 12 Nov. 2021 by Cheng Chen et al. (https://mentor.ieee.org/802.11/dcn/20/11-20-1851-02-00bf-overview-of-wi-fi-sensing-protocol.pptx), *Definitions and scenarios of the WLAN sensing*, published on 12 Jan. 2021 by Rui Du et al. (https://mentor.ieee.org/802.11/dcn/21/11-21-0147-03-00bf-definitions-and-scenarios-of-the-wlan-sensing-follow-ups.pptx), and *Definitions and scenarios of the WLAN sensing—follow ups*, published on 26 Jan. 2021 by Rui Du et al. (https://mentor.ieee.org/802.11/dcn/20/11-20-1851-02-00bf-overview-of-wi-fi-sensing-protocol.pptx). CSI-based sensing and radar-based sensing will be explained with reference to FIG. 3, following the definitions given in these documents.

In one or more embodiments, the first communication unit and the second communication unit are configured to operate at different frequencies, and the controller is configured to cause the first communication unit and the second communication unit to operate concurrently by enabling simultaneous sensing operations of the first communication unit and the second communication unit within a predefined time slot. In this way, an adequate target detection sensitivity may be achieved both at short distances and large distances. In one or more embodiments, the first communication unit and the second communication unit are configured to operate at different frequencies, and the controller is configured to cause the first communication unit and the second communication unit to operate concurrently by enabling sequential sensing operations of the first communication unit and the second communication unit within a predefined time slot. By enabling sequential sensing operations of the first communication unit and the second communication unit, crosstalk between the first communication unit and the second communication unit may be mitigated while maintaining the advantage of sensing the target essentially at the same time.

In one or more embodiments, the controller is further configured to cause the first communication unit and the second communication unit to operate at different frequencies having a gap therebetween. In this way, crosstalk or interference may also be avoided if the first communication unit and the second communication unit operate at different frequencies, but in the same frequency range. In one or more embodiments, the controller is further configured to cause the first communication unit and the second communication unit to operate at different frequencies having no gap therebetween. In this way, the effective bandwidth may be increased by fusing adjacent communication channels.

In one or more embodiments, the first communication unit and the second communication unit are configured to operate at substantially the same frequency, and the controller is configured to cause the first communication unit and the second communication unit to operate concurrently by enabling sequential sensing operations of the first communication unit and the second communication unit within a predefined time slot. In this way, a reduced frequency occupation may be achieved, as well as a reduced interference to other users of the same frequency range.

In one or more embodiments, the system comprises an antenna which is shared between the first communication unit and the second communication unit. In this way, the system may be implemented efficiently when the first communication unit and the second communication unit operate in the same or similar frequency range. In one or more embodiments, the system further comprises a first antenna coupled to the first communication unit and a second antenna coupled to the second communication unit. In this way, support may be provided for operating the first communication unit and the second communication unit in different frequency ranges.

In a practical implementation, the first communication unit and the second communication unit are implemented on a single integrated circuit and integrated into a single communication device. In another practical implementation, the first communication unit and the second communication unit are implemented on separate integrated circuits and integrated into a single communication device. In a further practical implementation, the first communication unit and the second communication unit are implemented on separate integrated circuits and integrated into separate communication devices. For example, UWB and Wi-Fi units may be implemented on the same chip and integrated into the same communication device (e.g., a smartphone). Alternatively, the UWB and Wi-Fi units may be implemented on separate chips, but still be integrated into the same communication device. Alternatively, the UWB and Wi-Fi units may be implemented on separate chips and also be integrated into separate communication devices (e.g., a smartphone with a Wi-Fi unit and a smartwatch with a UWB unit performing radar and sensing operations).

FIG. 2 shows an illustrative embodiment of a method for facilitating an external object. The method 200 comprises the following steps. At 202, at least one first communication unit transmits and receives one or more first signals. At 204, at least one second communication unit transmits and receives one or more second signals. At 206, a controller controls the first communication unit and the second communication unit, wherein the controller causes the first communication unit and the second communication unit to operate concurrently and to use the first signals received by the first communication unit and the second signals received by the second communication unit while said first communication unit and second communication unit are operating concurrently for detecting the external object. As mentioned above, the overall detection performance may thereby be increased, since the controller may use information from different units having specific detection capabilities.

Figure 3:
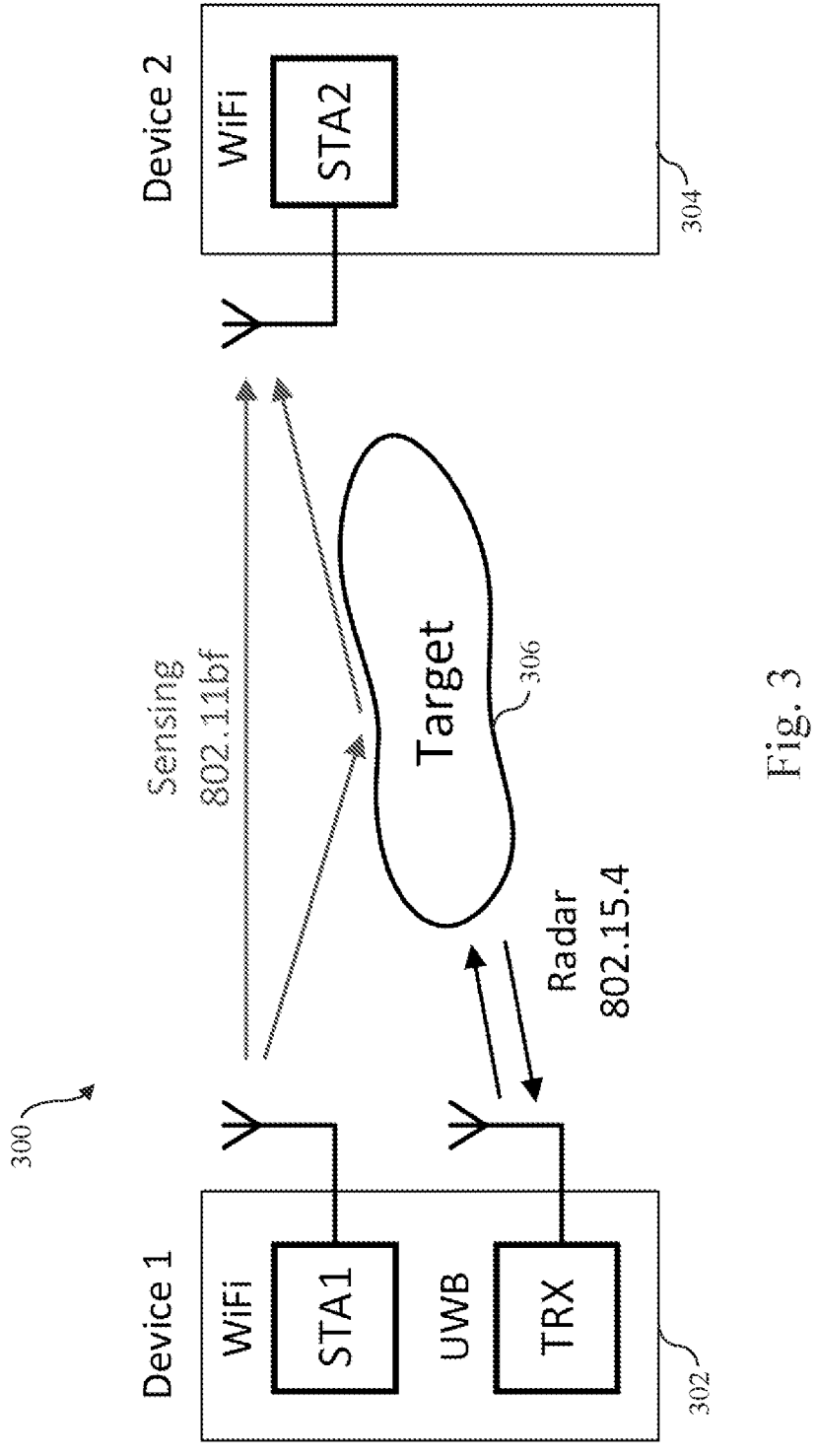
FIG. 3 shows another illustrative embodiment of a system for facilitating detecting an external object.

FIG. 3 shows another illustrative embodiment of a system 300 for facilitating detecting an external object 306. The system 300 includes a first device 302 and a second device 304. The first device 302 includes a Wi-Fi communication unit or station (STA1) and a UWB transceiver (TRX). Furthermore, the second device 304 includes a Wi-Fi communication unit (STA2). The UWB transceiver of the first device 302 may transmit radar signals, which are reflected by the external object or target 306, in accordance with the IEEE 802.15.4 standard. These reflected radar signals may be used to detect the presence of the target 306. In addition, the first device 302 may perform sensing operations by communicating with the second device 304 through their Wi-Fi communication units (STA1, STA2), in accordance with the IEEE 802.11bf standard.

Generally speaking, the following definitions are used in the area of CSI-based and radar-based Wi-Fi sensing. A sensing procedure is the procedure that allows a station (STA) to perform Wi-Fi sensing and obtain measurements. Furthermore, a sensing session is an instance of a sensing procedure, defined through a scheduling procedure (if applicable) and sensing parameters (such as RF parameters and packet/PPDU configuration parameters). A sensing initiator is the STA that initiates a sensing session with the goal of obtaining the sensing result. Furthermore, a sensing transmitter is the STA that transmits a sensing signal (RF signal) to a target area, and sensing receiver is the STA that receives reflections or echoes from a target area. A sensing processor is the STA that processes the measurements to obtain the sensing result. Furthermore, a sensing measurement is defined as the measurement of the target area (e.g., raw CSI or a received radar echo). Finally, the sensing result is the result of processing the sensing measurement at the processor (e.g., compressed CSI or range-Doppler map). It is noted that a sensing initiator may be a non-standalone device or a standalone device. Furthermore, a sensing system may include one or many transmitters, receivers or processors. Furthermore, it is noted that a session initiated by an initiator comprises a sensing negotiation, a sensing measurement, and sensing feedback. In the negotiation phase the initiator defines the STAs that will be involved in the sensing session and assigns the sensing roles (i.e., which STA is transmitting, receiving and processing measurements). Furthermore, in the sensing measurement phase the assigned transmitter transmits a sensing signal to the target area, and an assigned receiver receives reflections or echoes from the target area, thereby obtaining measurements of the target area. Finally, in the sensing feedback phase the measurements are sent to the processor to obtain the sensing result, and the sensing result is sent to the initiator. The skilled person will appreciate that the processor may or may not be the initiator.

With reference to FIG. 3, the Wi-Fi based object or target detection may be performed as follows. The first station STA1 is the initiator of a ranging session (i.e., it will receive the sensing result) and assigns itself the role of a transmitter and STA2 the role of a receiver. The first station STA1 also includes the processor. The transmitter of STA1 transmits a sensing signal (multiple physical layer protocol data unit packets, or PPDUs) to the target area. Then, the receiver of STA2 receives reflections or echoes from the target area, which are the sensing measurements (e.g., raw CSI). Subsequently, the second station STA2 sends the sensing measurements to STA1, and the processor of STA1 processes the measurements to obtain the sensing result. Finally, a detection decision is made based on the sensing result. It is noted that a specific detection may be performed as follows. When the processor processes the measurements, the range-Doppler map may be generated from a Fourier-transformed CIR which is obtained from the CSI measurements, a maximum peak in the range-Doppler map may be detected, which may be used as indication of a detected target. Furthermore, when PPDUs are transmitted over time then each CSI would give another peak in the range-Doppler map and tracking the location of the peak corresponds to tracking the distance and velocity of the target.

Thus, in a practical implementation of the presently disclosed system, a sub-10 GHz UWB radar unit (IEEE 802.15.4) and a 60 GHz Wi-Fi sensing unit (802.11bf) may be operated concurrently, and the resulting radar information and sensing information may be fused to improve the target detection capability (e.g., the Doppler sensitivity). In particular, by operating both units concurrently it may be possible to leverage the advantages of each system as described in Table 1. Alternatively, sub-10 GHz UWB radar may be operated concurrently with Wi-Fi sensing in the same frequency range (WiFi6e). It is noted that the word "concurrent" as used herein may be broadly defined, for example in accordance with the definition given in the Merriam-Webster dictionary: "acting in conjunction", or "operating or occurring at the same time", or "exercised over the same matter or area by two different authorities". In the latter case, "area" would be an area to detect a target in, and "authorities" would be two independent RF technologies (UWB and Wi-Fi) used for detection.

It is noted that the radar information and sensing information may be fused in different ways. For example, an object may be deemed to be detected if at least one of these types of information, i.e., the CIR data and the CSI data, indicates the presence of said object. Another way would be a data-driven approach, based on a convolutional neural network (CNN) as used for deep learning. In that case, the range-Doppler map may be computed from both the CSI and the CIR, then both maps may be concatenated and fed into a pre-trained CNN for classification (e.g., target detected yes/no or classify a gesture such as a hand movements). In another implementation, features may be extracted from the CSI and the CIR and processed with a standard machine learning classifier (e.g., a support vector machine or a random forest). Yet another way would be to compute the Wi-Fi CIR obtained from an inverse Fourier transform of the CSI (which essentially is a frequency domain representation of the channel) and combine it with the UWB CIR to obtain a CIR with improved resolution (due to the wider effective bandwidth).

Figures 4A, 4B:
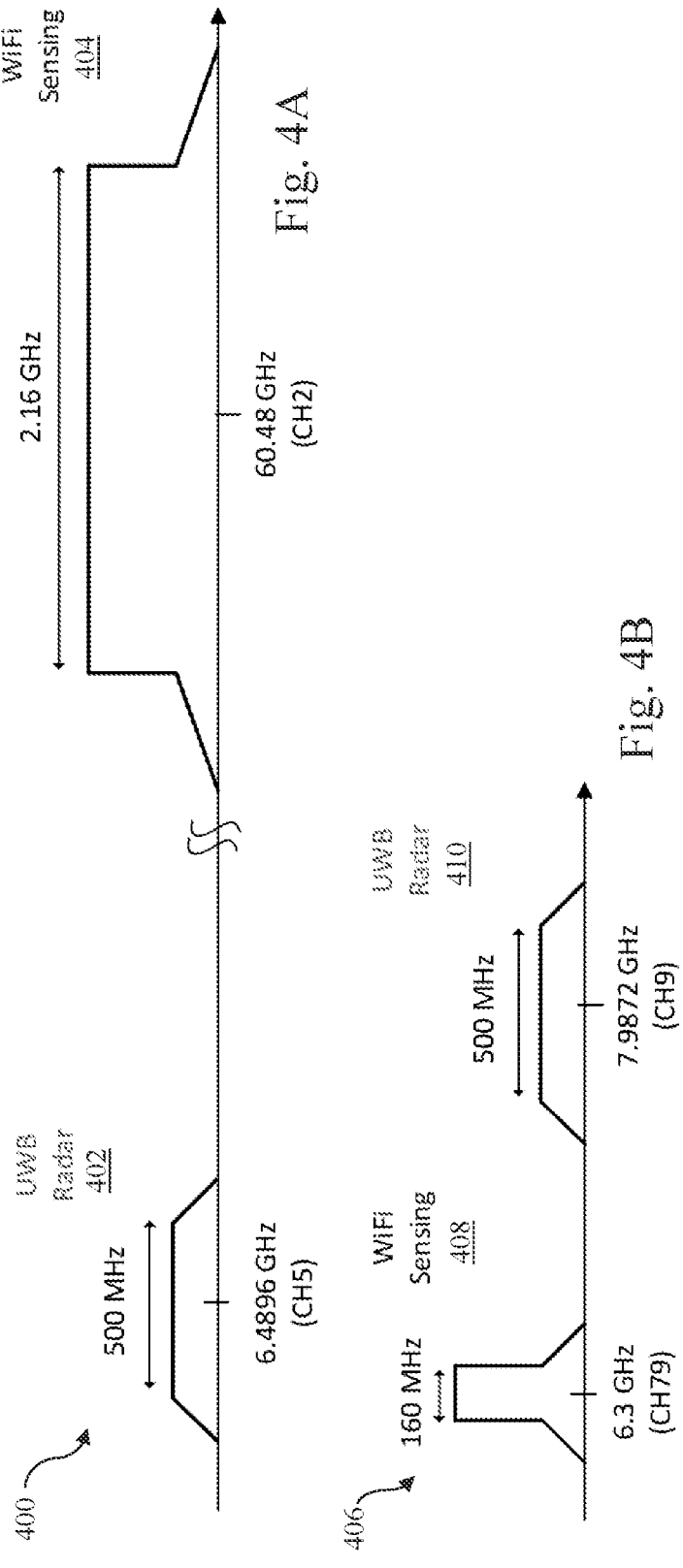
FIG. 4A shows an illustrative embodiment of concurrent sensing operations in different frequency bands.
FIG. 4B shows another illustrative embodiment of concurrent sensing operations in different frequency bands.

FIG. 4A shows an illustrative embodiment of concurrent sensing operations 400 in different frequency bands. In particular, UWB radar 402 on CH5, with a bandwidth (BW) of 500 MHz, is concurrently operated with Wi-Fi sensing 404 in the 60 GHz range, with a BW of e.g., 2.16 GHz. In this way, an effective BW of approximately 2.6 GHz can be used to detect targets at a close distance (note that 60 GHz typically has a limited range due to higher path loss). Simultaneously, UWB radar can still detect targets at a larger distance, but with a smaller BW of 500 MHz. In effect, for this use case the concurrent operation improves the target detection sensitivity at short distance (larger BW) while maintaining the sensitivity at larger distance due to the use of UWB-based radar technology.

FIG. 4B shows another illustrative embodiment of concurrent sensing operations 406 in different frequency bands. In particular, UWB radar 410 on CH9 is concurrently operated with WiFi6e sensing 408 on CH79, both being in the same sub-10 GHz frequency range. In this way, the effective bandwidth of UWB is extended by 160 MHz resulting in improved range resolution which is inversely proportional to the BW. It is noted that CH5, CH9 refer to channels defined by the IEEE802.15.4 standard, and CH2, CH79 refer to channels defined by the Wi-Fi standard.

Figure 5:
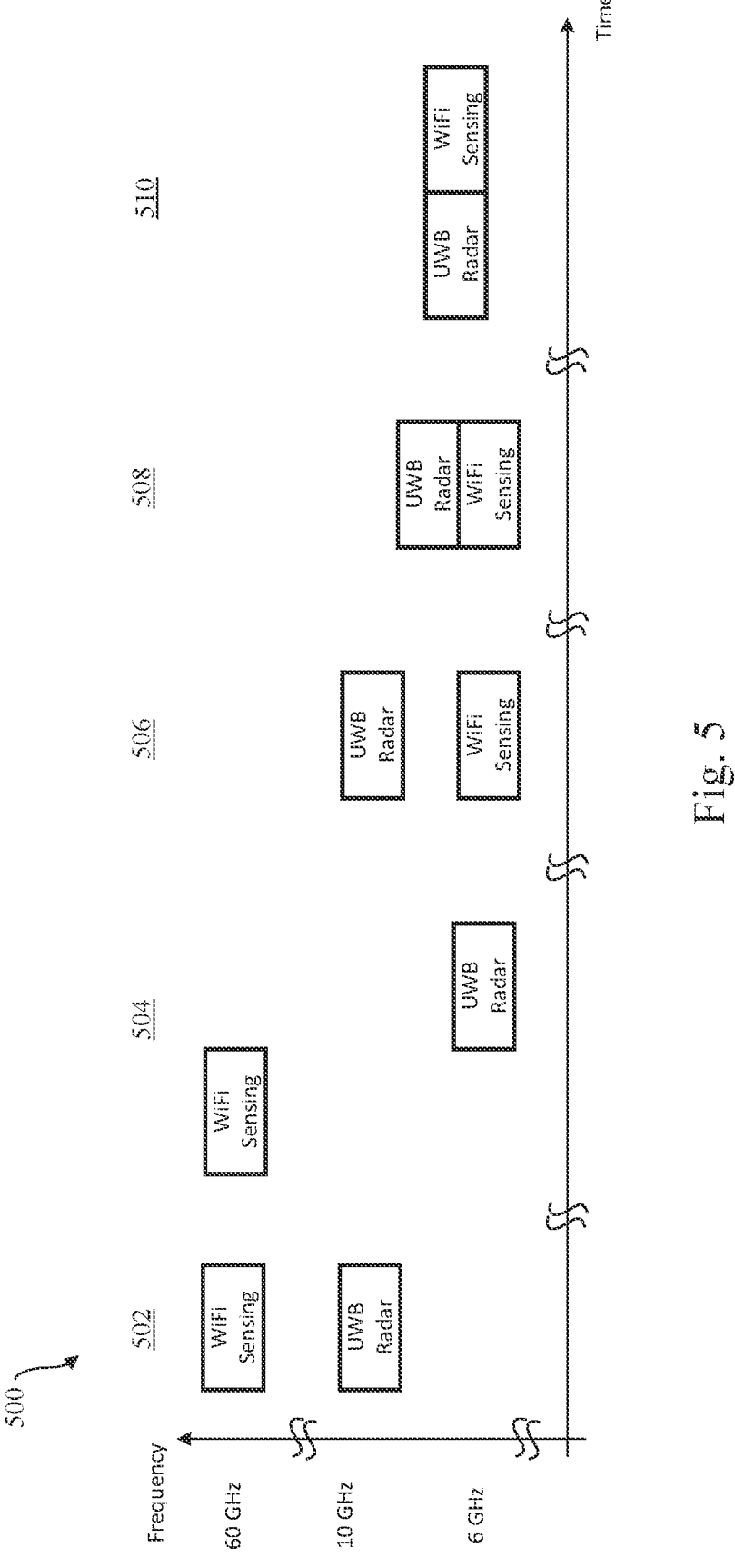
FIG. 5 shows an illustrative embodiment of sensing operations in different time slots.

FIG. 5 shows an illustrative embodiment of sensing operations 500 in different time slots 502, 504, 506, 508, 510. In the first time slot 502 and the second time slot 504, concurrent UWB radar and 60 GHz Wi-Fi sensing operations are performed. In the first time slot 502, the UWB radar and Wi-Fi sensing operations are performed simultaneously. In the second time slot 504, UWB radar and Wi-Fi sensing operations are performed sequentially. It is noted that performing the UWB radar and Wi-Fi sensing operations sequentially in the predefined time slot 504 has the advantage that potential crosstalk between UWB and Wi-Fi may be mitigated. Furthermore, in the third, fourth and fifth time slots 506, 508, 510 concurrent UWB radar and Wi-Fi sensing operations are performed in the same frequency range of 6-10 GHz. In the third time slot 506, the UWB radar and Wi-Fi sensing operations are performed simultaneously but at different frequencies (i.e., channels) with a frequency gap in order to avoid potential interference or crosstalk. Furthermore, in the fourth time slot 508, the UWB radar and Wi-Fi sensing operations are performed simultaneously but at different frequencies (i.e., channels) with the frequency gap being zero; this has the advantage that the effective BW may be increased by fusing adjacent channels. Finally, in the fifth time slot 510 the UWB radar and Wi-Fi sensing operations are performed at the same frequency, but at different times (sequentially), which may result in a reduced frequency occupation and a reduced interference to other users of the same frequency range and may result in a more robust target detection performance in the presence of interference from other users.

Figure 6:
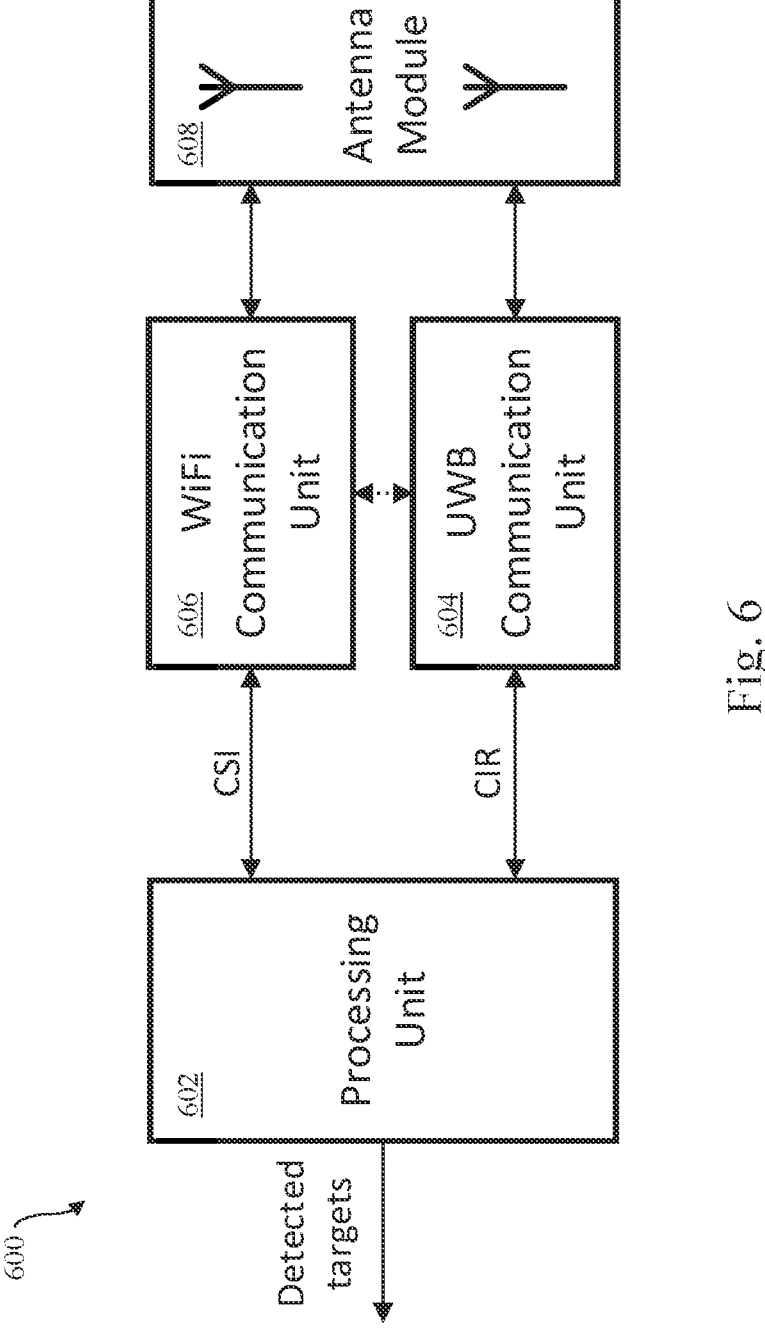
FIG. 6 shows a further illustrative embodiment of a system for facilitating detecting an external object.

FIG. 6 shows a further illustrative embodiment of a system 600 for facilitating detecting an external object. The system 600 comprises a processing unit 602 coupled to a Wi-Fi communication unit 606 and to a UWB communication unit 604, which in turn are coupled to an antenna module 608. The Wi-Fi communication unit 606 performs the sensing operation according to the upcoming 802.11bf sensing standard, whereas the UWB communication unit 604 performs radar operation according to the upcoming 802.15.4 radar standard extension. The processing unit 602 receives channel state information (CSI) from the Wi-Fi communication unit 606 and channel impulse response (CIR) data from the UWB communication unit 604. Both CSI and CIR contain information about one or more potential targets monitored in a detection area, such as the range, velocity and angle of a target. The processing unit 604 fuses the information contained in the CSI and the CIR to provide an overall system performance that is superior (e.g., a better target detection sensitivity) than if either UWB or Wi-Fi is operated on its own. The antenna module 608 receives and transmits radio frequency (RF) signals for sensing and radar. In the case of radar-based target detection, these RF signals may be referred to as radar signals. The antenna module 608 may comprise one antenna that is shared for the concurrent operation in WiFi6e and UWB bands due to the similar frequency range of 6-10 GHz. Alternatively, the antenna module 608 may comprise two separate antennas, one for 60 GHz Wi-Fi communication and one for 6-10 GHz UWB communication.

Accordingly, not only the presence of a target may be detected, but also its position or movement. In the unlikely case that the CSI and CIR result in contradicting conclusions, a reliability metric may apply to the outcome of each of CSI and CIR. For example, the Wi-Fi sensing result may be relied upon with a certain probability; this probability may be obtained from past detections or from a training phase. However, the radar or sensing system may also be designed to avoid such contradicting conclusions by first fusing CSI and CIR to obtain an "overall CIR" with improved target resolution and accuracy and then (i) making the decision of target present or absent or (ii) computing the distance or velocity based on this "overall CIR". In that case, the contradicting conclusions may be regarded as included in a false alarm rate or probability and a detection probability as specified during system and algorithm design. Similarly, by using the data-driven, deep learning approach described above, the CNN would receive both CSI and CIR as inputs and there would be no contradicting conclusions, only a wrong detection at the output.

It is noted that an extended target detection system may include multiple devices. For example, a device involved in concurrent UWB radar and Wi-Fi sensing operations may contain either a UWB unit or a Wi-Fi unit or both. Thus, concurrent UWB radar and Wi-Fi sensing need not be limited to one device only but may involve multiple devices. For example, a first device may contain a Wi-Fi sensing initiator (STA1), a second device may contain a Wi-Fi sensing responder (STA2) and a third device may contain a UWB-based radar transceiver (e.g., implementing monostatic radar). Accordingly, in this example the first communication unit and the second communication unit (i.e., the Wi-Fi sensing initiator) are implemented as separate communication devices.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 system for facilitating detecting an external object
102 controller
104 first communication unit
106 second communication unit
200 method for facilitating detecting an external object
202 transmitting and receiving, by at least one first communication unit, one or more first signals

204 transmitting and receiving, by at least one second communication unit, one or more second signals
206 controlling, by a controller, the first communication unit and the second communication unit, wherein the controller causes the first communication unit and the second communication unit to operate concurrently and to use the first signals received by the first communication unit and the second signals received by the second communication unit while said first communication unit and second communication unit are operating concurrently for detecting the external object
300 system for facilitating detecting an external object
302 first device
304 second device
306 external object (target)
400 concurrent sensing operations in different frequency bands
402 UWB radar sensing operation
404 Wi-Fi sensing operation
406 concurrent sensing operations in different frequency bands
408 Wi-Fi sensing operation
410 UWB radar sensing operation
500 sensing operations in different time slots
502 first time slot
504 second time slot
506 third time slot
508 fourth time slot
510 fifth time slot
600 system for facilitating detecting an external object
602 processing unit
604 UWB communication unit
606 Wi-Fi communication unit
608 antenna module

The invention claimed is:

1. A system for detecting an external object, the system comprising:
at least one first communication unit comprising a transceiver configured to transmit and receive one or more first signals in a frequency range of 6-10 gigahertz (GHz), wherein the at least one first communication unit is an ultra-wideband radar communication unit;
at least one second communication unit comprising a transceiver configured to transmit and receive one or more second signals in a sub-7 GHz frequency range or in a 60 GHz frequency range, wherein the at least one second communication unit is different from an ultra-wideband radar communication unit; and
a controller configured to control the at least one first communication unit and the at least one second communication unit, wherein the controller is configured to cause the at least one first communication unit and the at least one second communication unit to operate concurrently and configured to detect the external object based on the one or more first signals received by the at least one first communication unit and the one or more second signals received by the at least one second communication unit while the at least one first communication unit and the at least one second communication unit are operating concurrently.

2. The system of claim 1, wherein:
the at least one second communication unit is a Wi-Fi communication unit operated in a radio frequency communication mode, a Wi-Fi communication unit operated in a radar mode, or a Bluetooth™ communication unit.

3. The system of claim 1, wherein the at least one first communication unit and the at least one second communication unit are configured to operate at different frequencies, and wherein the controller is configured to cause the at least one first communication unit and the at least one second communication unit to operate concurrently by enabling simultaneous sensing operations of the at least one first communication unit and the at least one second communication unit within a predefined time slot.

4. The system of claim 3, wherein the controller is further configured to cause the at least one first communication unit and the at least one second communication unit to operate at different frequencies having a gap therebetween.

5. The system of claim 3, wherein the controller is further configured to cause the at least one first communication unit and the at least one second communication unit to operate at different frequencies having no gap therebetween.

6. The system of claim 1, wherein the at least one first communication unit and the at least one second communication unit are configured to operate at different frequencies, and wherein the controller is configured to cause the at least one first communication unit and the at least one second communication unit to operate concurrently by enabling sequential sensing operations of the at least one first communication unit and the at least one second communication unit within a predefined time slot.

7. The system of claim 6, wherein the controller is further configured to cause the at least one first communication unit and the at least one second communication unit to operate at different frequencies having a gap therebetween.

8. The system of claim 6, wherein the controller is further configured to cause the at least one first communication unit and the at least one second communication unit to operate at different frequencies having no gap therebetween.

9. The system of claim 1, wherein the at least one first communication unit and the at least one second communication unit are configured to operate at substantially a same frequency, and wherein the controller is configured to cause the at least one first communication unit and the at least one second communication unit to operate concurrently by enabling sequential sensing operations of the at least one first communication unit and the at least one second communication unit within a predefined time slot.

10. The system of claim 1, further comprising an antenna which is shared between the at least one first communication unit and the at least one second communication unit.

11. The system of claim 1, further comprising a first antenna coupled to the at least one first communication unit and a second antenna coupled to the at least one second communication unit.

12. The system of claim 1, wherein:
the at least one first communication unit and the at least one second communication unit are implemented on a single integrated circuit and integrated into a single communication device; or
the at least one first communication unit and the at least one second communication unit are implemented on separate integrated circuits and integrated into a single communication device; or
the at least one first communication unit and the at least one second communication unit are implemented on separate integrated circuits and integrated into separate communication devices.

13. A method for detecting an external object, comprising:
transmitting and receiving, by at least one first communication unit, one or more first signals in a frequency range of 6-10 gigahertz (GHz), wherein the at least one first communication unit is an ultra-wideband radar communication unit;
transmitting and receiving, by at least one second communication unit, one or more second signals in a sub-7 GHz frequency range or in a 60 GHz frequency range, wherein the at least one second communication unit is different from an ultra-wideband radar communication unit; and
controlling, by a controller, the at least one first communication unit and the at least one second communication unit, wherein the controller causes the at least one first communication unit and the at least one second communication unit to operate concurrently and detects the external object based on the one or more first signals received by the at least one first communication unit and the one or more second signals received by the at least one second communication unit while the at least one first communication unit and the at least one second communication unit are operating concurrently.

14. The method of claim 13, wherein:
the at least one second communication unit is a Wi-Fi communication unit operated in a radio frequency communication mode, a Wi-Fi communication unit operated in a radar mode, or a Bluetooth™ communication unit.

15. The method of claim 13, wherein the at least one first communication unit and the at least one second communication unit operate at different frequencies, and wherein the controller causes the at least one first communication unit and the at least one second communication unit to operate concurrently by enabling simultaneous sensing operations of the at least one first communication unit and the at least one second communication unit within a predefined time slot.

16. The method of claim 13, wherein the at least one first communication unit and the at least one second communication unit operate at different frequencies, and wherein the controller causes the at least one first communication unit and the at least one second communication unit to operate concurrently by enabling sequential sensing operations of the at least one first communication unit and the at least one second communication unit within a predefined time slot.

17. The method of claim 13, wherein the at least one first communication unit and the at least one second communication unit are configured to operate at substantially a same frequency, and wherein the controller is configured to cause the at least one first communication unit and the at least one second communication unit to operate concurrently by enabling sequential sensing operations of the at least one first communication unit and the at least one second communication unit within a predefined time slot.

18. The method of claim 13, wherein a first antenna is coupled to the at least one first communication unit and a second antenna is coupled to the at least one second communication unit.

19. The method of claim 13, wherein:
the at least one first communication unit and the at least one second communication unit are implemented on a single integrated circuit and integrated into a single communication device; or
the at least one first communication unit and the at least one second communication unit are implemented on separate integrated circuits and integrated into a single communication device; or the at least one first communication unit and the at least one second communication unit are implemented on separate integrated circuits and integrated into separate communication devices.

20. The method of claim 13, wherein an antenna is shared between the at least one first communication unit and the at least one second communication unit.

* * * * *